(12) United States Patent
Busche (10) Patent No.: US 10,520,371 B2
(45) Date of Patent: Dec. 31, 2019

(54) OPTICAL FIBER TEMPERATURE SENSORS, TEMPERATURE MONITORING APPARATUS, AND MANUFACTURING METHODS

(71) Applicant: Applied Materials, Inc., Santa Clara, CA (US)

(72) Inventor: Matthew Busche, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 10 days.

(21) Appl. No.: 14/920,758

(22) Filed: Oct. 22, 2015

(65) Prior Publication Data

US 2017/0115169 A1 Apr. 27, 2017

(51) Int. Cl.
| | |
|---|---|
| *G01K 11/32* | (2006.01) |
| *C03C 25/16* | (2006.01) |
| *G02B 6/26* | (2006.01) |
| *G02B 6/255* | (2006.01) |
| *C03C 25/1065* | (2018.01) |

(52) U.S. Cl.
CPC .............. *G01K 11/32* (2013.01); *C03C 25/16* (2013.01); *C03C 25/1068* (2018.01); *G02B 6/2552* (2013.01); *G02B 6/262* (2013.01)

(58) Field of Classification Search
CPC .......... G01J 5/048; G01J 5/0821; G01J 5/004; G01J 5/04; G01J 5/042; G01J 5/0887
See application file for complete search history.

(56) References Cited

U.S. PATENT DOCUMENTS

| | | |
|---|---|---|
| 1,475,365 A | 11/1923 | Scheuler et al. |
| 3,659,915 A | 5/1972 | Maurer et al. |
| 4,223,226 A | 9/1980 | Quick et al. |
| 4,576,486 A | 3/1986 | Dils |
| 4,629,485 A | 12/1986 | Berkey |
| 4,737,038 A | 4/1988 | Dostoomian |
| 4,750,139 A | 6/1988 | Dils |
| 4,794,619 A | 12/1988 | Tregay |
| 4,845,647 A | 7/1989 | Dils et al. |
| RE33,245 E | 6/1990 | Tojyo et al. |
| 5,078,507 A | 1/1992 | Koller |
| 5,164,999 A | 11/1992 | Shifflett |

(Continued)

OTHER PUBLICATIONS

Perlov et al., U.S. Appl. No. 10/193,605, titled: "Method and Apparatus for Improved Substrate Handling", filed Jul. 11, 2002.

(Continued)

*Primary Examiner* — Thomas A Hollweg
*Assistant Examiner* — Erin D Chiem
(74) *Attorney, Agent, or Firm* — Lowenstein Sandler LLP (57) ABSTRACT

An optical fiber temperature sensor including a lead-in fiber and black body emitter. The lead-in optical fiber includes a fiber end, and the black body emitter is fused on the fiber end, wherein the black body emitter is made up of a melted high emissivity material included integrally in melted silica. Further embodiments include temperature monitoring apparatus with one or more optical fiber temperature sensors, and electronic device processing apparatus including optical fiber temperature monitoring. Numerous other aspects and embodiments are included.

20 Claims, 8 Drawing Sheets

(56) References Cited

U.S. PATENT DOCUMENTS

| | | | |
|---|---|---|---|
| 5,183,338 A * | 2/1993 | Wickersheim | G01J 1/58 374/131 |
| 5,255,980 A | 10/1993 | Thomas et al. | |
| 5,364,186 A | 11/1994 | Wang et al. | |
| 5,709,473 A | 1/1998 | Sultan et al. | |
| 5,838,121 A | 11/1998 | Fairebairn et al. | |
| 5,951,770 A | 9/1999 | Perlov et al. | |
| 6,109,783 A | 8/2000 | Dobler et al. | |
| 6,226,453 B1 | 5/2001 | Yam et al. | |
| 6,287,386 B1 | 9/2001 | Perlov et al. | |
| 6,379,095 B1 | 4/2002 | Elliot et al. | |
| 6,468,353 B1 | 10/2002 | Perlov et al. | |
| 6,572,265 B1 * | 6/2003 | Gotthold | G01J 5/0003 250/234 |
| 6,575,737 B1 | 6/2003 | Perlov et al. | |
| 6,582,175 B2 | 6/2003 | Cox et al. | |
| 6,846,105 B2 | 1/2005 | Xie et al. | |
| 6,916,397 B2 | 7/2005 | Pfeiffer et al. | |
| 7,197,199 B2 * | 3/2007 | Cuypers | G01J 5/0003 374/E11.015 |
| 7,720,655 B2 | 5/2010 | Rice | |
| 7,927,062 B2 | 4/2011 | Rice et al. | |
| 8,016,542 B2 | 9/2011 | Cox et al. | |
| 8,876,372 B2 * | 11/2014 | Cuypers | G01J 5/041 374/131 |
| 2003/0206573 A1 | 11/2003 | Gotthold et al. | |
| 2005/0072716 A1 | 4/2005 | Quiles et al. | |
| 2009/0108544 A1 | 4/2009 | Sico et al. | |
| 2010/0178146 A1 | 7/2010 | Kremerman et al. | |
| 2010/0178147 A1 | 7/2010 | Kremerman et al. | |
| 2012/0147381 A1 * | 6/2012 | LeBlanc | E21B 47/123 356/480 |
| 2012/0327971 A1 * | 12/2012 | Goda | G01J 5/004 374/140 |
| 2014/0262036 A1 | 9/2014 | Reuter et al. | |
| 2014/0263165 A1 | 9/2014 | Hongkham et al. | |
| 2014/0273487 A1 | 9/2014 | Deshmukh et al. | |
| 2015/0013771 A1 | 1/2015 | Quiles et al. | |
| 2015/0045961 A1 | 2/2015 | Koshti et al. | |
| 2015/0070814 A1 | 3/2015 | Parkhe et al. | |
| 2015/0082625 A1 | 3/2015 | Rice et al. | |
| 2015/0083330 A1 | 3/2015 | Madiwal et al. | |
| 2015/0090341 A1 | 4/2015 | Ng et al. | |

OTHER PUBLICATIONS

Busche et al., U.S. Appl. No. 14/299,850, titled: "Substrate Temperature Control Apparatus Including Optical Fiber Heating, Substrate Temperature Control Systems, Electronic Device Processing Systems, and Methods," filed Jun. 9, 2014.

Busche et al., U.S. Appl. No. 14/738,448, titled: "Apparatus, Systems, and Methods for Temperature Control of Substrates Using Embedded Fiber Optics and Epoxy Optical Diffusers," filed Jun. 12, 2015.

Busche et al., U.S. Appl. No. 14/737,799, titled: "Temperature Control Apparatus Including Groove-Routed Optical Fiber Heating, Substrate Temperature Control Systems, Electronic Device Processing Systems, and Processing Methods," filed Jun. 12, 2015.

Kyoto et al., "Characterization of fluorine-doped silica glasses," Journal of Materials Science, Jan. 1993, vol. 28, Issue 10, pp. 2738-2744.

Material Safety Data Sheet, Product: HiE-Coat 840-C, Revision Date: Jan. 3, 2012.

Optical Fibers, Fiberguide, Sep. 30, 2015, http://www.fiberguide.com/product/optical-fibers/.

International Search Report and Written Opinion of International Application No. PCT/US16/53592 dated Dec. 14, 2016.

\* cited by examiner

OPTICAL FIBER TEMPERATURE SENSORS, TEMPERATURE MONITORING APPARATUS, AND MANUFACTURING METHODS

FIELD

The present invention relates to optical fiber temperature sensors, and more specifically to apparatus for monitoring temperature such as during high-temperature substrate processing.

BACKGROUND

In some electronic device manufacturing systems, one or more process chambers may be arranged around a mainframe housing including a transfer chamber and one or more load lock chambers. The process chambers may perform one or more processes on a substrate (e.g., a wafer) inserted into the process chamber. Processing may include a chemical vapor deposition (CVD) process, such as plasma-enhanced chemical vapor deposition (PECVD) process that is used to deposit a thin film on the substrate. Other temperature-controlled processes may be carried out on the substrates, as well. During processing, wafers may rest on a support (e.g., a substrate platform) and the temperature thereof may be controlled (e.g., heated) at one or more times during the process. Conventionally, heating may be provided by resistive elements provided within the substrate pedestal.

It should be recognized, however, that even small variations in temperature across the substrate during such temperature-controlled processing may cause differential processing (e.g., possibly uneven deposition) or other processing deviations, which may be detrimental to achieving desired properties for the substrate.

Accordingly, apparatus and methods providing improved temperature monitoring and control in high-temperature substrate processing are desired.

SUMMARY

In one aspect, an optical fiber temperature sensor is provided. The optical fiber temperature sensor includes a lead-in fiber including a fiber end, and a black body emitter fused on the fiber end, the black body emitter including melted high emissivity material included integrally in melted silica.

In another aspect, a temperature monitoring apparatus is provided. The temperature monitoring apparatus includes a substrate platform, a channel formed in the substrate platform, and an optical fiber temperature sensor received in the channel, the optical fiber temperature sensor including a lead-in fiber including a fiber end, and a black body emitter fused on the fiber end, the black body emitter including a melted high emissivity material included integrally in melted silica.

In another aspect, a method of manufacturing an optical fiber temperature sensor is provided. The method includes providing a lead-in fiber including a core, a cladding, and a fiber end, coating the fiber end with a high emissivity material to form a coated fiber end, and fusing the coated fiber end to produce a black body emitter including a high emissivity material included integrally in melted silica.

Numerous other aspects are provided in accordance with these and other embodiments of the invention. Other features and aspects of embodiments of the present invention will become more fully apparent from the following description, appended claims, and the accompanying drawings.

BRIEF DESCRIPTION OF THE DRAWINGS

Persons skilled in the art will understand that the drawings, described below, are for illustrative purposes only. The drawings are not necessarily drawn to scale and are not intended to limit the scope of this disclosure in any way.

DESCRIPTION

Within electronic device manufacturing systems that are configured to process substrates at high temperature, very precise temperature control may be desired. To achieve precise temperature control, precise temperature monitoring may be provided. In some electronic device manufacturing systems, such as PECVD systems, the systems are configured and adapted to operate at operating temperatures of above 500° C., of above 600° C., or even as high as 650° C. or above. Various methods have been employed that utilize single or multiple zones of heaters (e.g., resistive heaters) to accomplish temperature control. However, such systems, in general, may lack sufficient temperature control because of lack of suitable temperature sensors that have the ability to survive and function at such high temperatures (e.g., 500° C. and above) and also that are immune to RF interference. Further, the sensor should be small enough in overall size and relatively immune to corrosion.

According to one or more embodiments of the invention, temperature monitoring apparatus including one or more optical fiber temperature sensors that are configured and adapted to provide improved temperature measurement are provided. The temperature monitoring apparatus including one or more optical fiber temperature sensors may be used for monitoring temperature during high temperature substrate processing. The optical fiber temperature sensors, temperature monitoring apparatus, and methods of temperature monitoring described herein may provide improved overall temperature control. The improved temperature monitoring may be provided by improved temperature feedback from a substrate platform using the optical fiber temperature sensors. In this manner, the temperature control apparatus may be configured and adapted to thermally control a temperature of a substrate at high temperature, such as above 500° C., above 600° C., or even at 650° C. or above.

In some embodiments, a substrate temperature monitoring apparatus may include a substrate platform that is temperature-controlled and may include one or more optical fiber temperature sensors in accordance with one or more embodiments of the invention embedded or thermally coupled therein. The one or more optical fiber temperature sensors may be embedded in and extend within one or more channels (grooves or recesses) of the substrate platform. Each optical fiber temperature sensor may terminate at a desired location within the substrate platform. The multiple optical fiber temperature sensors may be used to provide temperature feedback from multiple individual locations or from multiple zones. The optical fiber temperature sensors may be used in conjunction with one or more heaters within the temperature-controlled platform, such as resistive heaters and/or optical fiber heaters therein. Combinations of optical fiber heating of the substrate platform with one or more optical fiber temperature sensors in thermal contact engagement with the substrate platform may be used.

Further details of example optical fiber temperature sensors, temperature monitoring apparatus, substrate temperature control systems including optical fiber temperature sensors, electronic device processing systems, and methods of manufacturing optical fiber temperature sensors are described with reference to FIGS. 1A-9 herein.

Figure 1A:
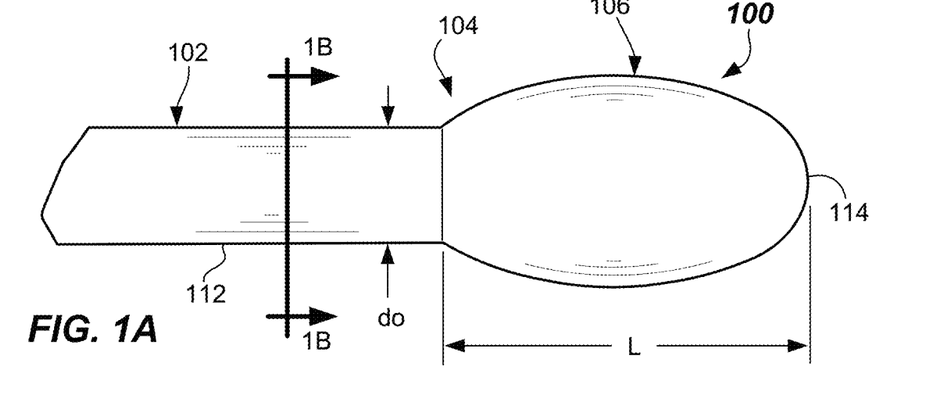
FIG. 1A illustrates a truncated side plan view of an optical fiber temperature sensor according to one or more embodiments.
Figure 1B:
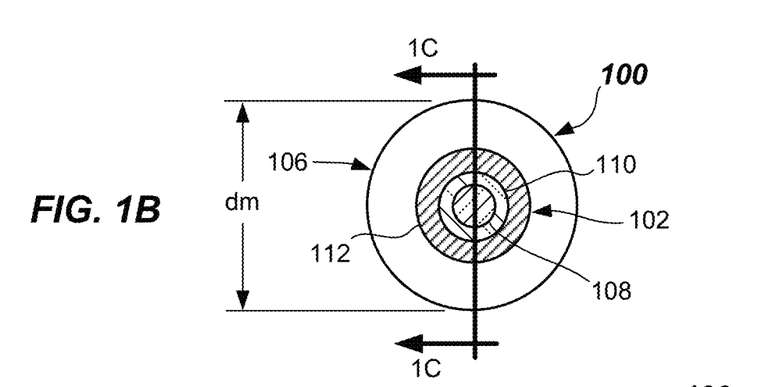
FIG. 1B illustrates a cross-sectioned end view of an optical fiber temperature sensor taken along section line 1B-1B of FIG. 1A according to one or more embodiments.
Figure 1C:
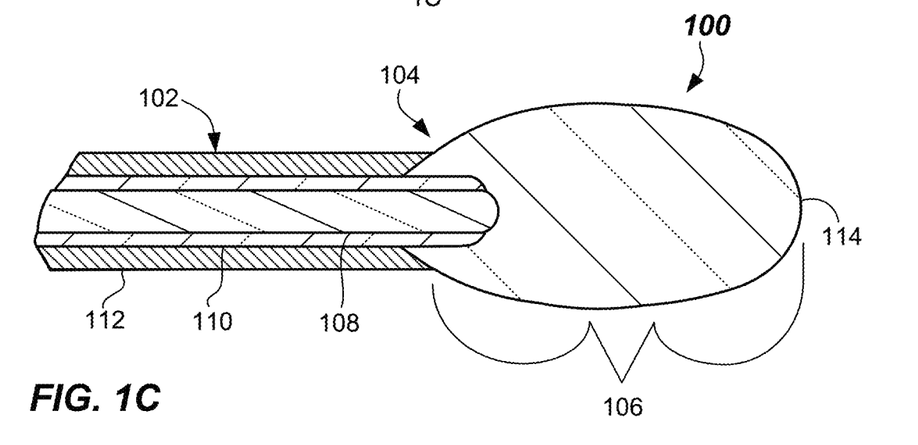
FIG. 1C illustrates a truncated cross-sectioned side view of an optical fiber temperature sensor according to one or more embodiments.

FIGS. 1A through 1C illustrate various views of a first embodiment of an optical fiber temperature sensor 100. The optical fiber temperature sensor 100 includes a lead-in fiber 102 (shown truncated) including a fiber end 104, and a black body emitter 106 fused to the fiber end 104. The black body emitter 106 includes a melted high emissivity material included integrally in melted silica. In particular, the emissivity material is melted, during processing, with silica and doped silica forming the core 108 and cladding 110 of the lead-in fiber 102 to provide a bulbous integral glass mass of melted high emissivity material and melted silica-containing material from the core 108 and cladding 110. As will be apparent from the following, the formation of the black body emitter 106 may be through exposure to high temperatures above the melting temperature of all the materials. In some embodiments, a fiber fusion splicer is used.

In one or more embodiments, the lead-in fiber 102 may be a multimode fiber, such as a step index multimode fiber. The lead-in fiber 102 may have a length of between about 0.5 m and about 3 m, for example. Other lengths may be used. In some embodiments, the core 108 and the cladding 110 may comprise silica. In one or more embodiments, the cladding 110 may comprise doped silica, such as fluorine-doped silica. The core 108 may comprise substantially-pure silica. However, multi-mode fibers include a core 108 that is doped (e.g., germanium-doped silica) and pure silica cladding may also be used.

In one or more embodiments, the lead-in fiber 102 may include a core 108 having a core outer diameter of between about 100 microns and 110 microns, for example. In one or more embodiments, the lead-in fiber 102 may include a cladding 110 having a cladding outer diameter of between about 120 microns and 130 microns. Other diameters of the core 108 and the cladding 110 may include core diameter/cladding diameter of 100 micron/140 micron; 200 micron/220 micron; 300 micron/330 micron; 400 micron/440 micron. The wavelengths of operation may be between about 190 nm to as much as 2400 nm, for example.

Figure 1D:
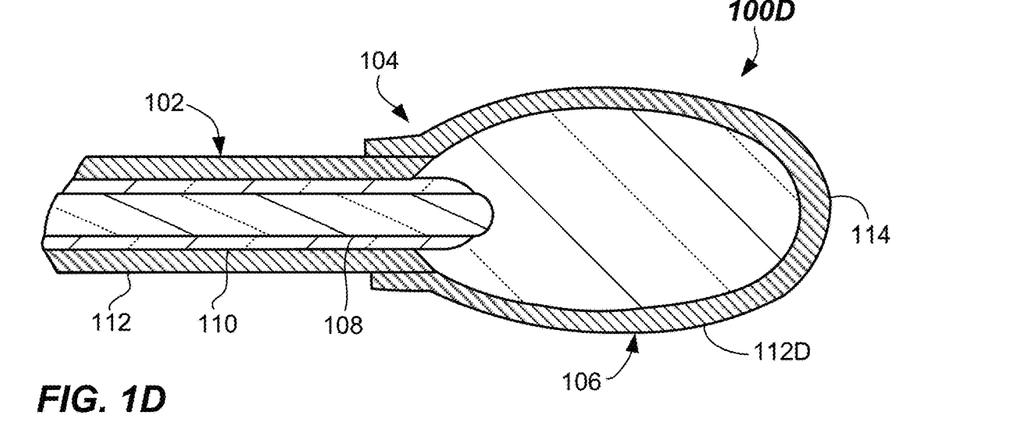
FIG. 1D illustrates a truncated cross-sectioned side view of an optical fiber temperature sensor including a metalized coating on the black body emitter according to one or more embodiments.
Figure 1E:
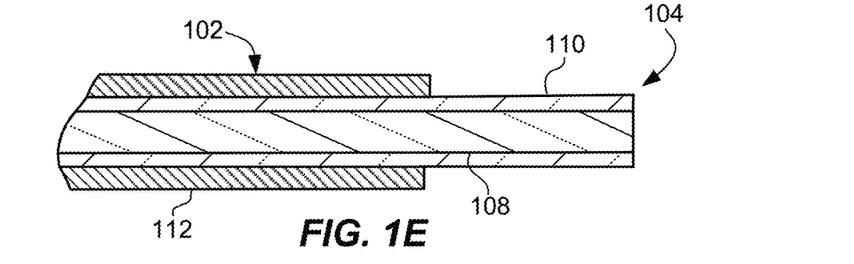
FIG. 1E illustrates a truncated cross-sectioned side view of a lead-in fiber including a metalized coating according to one or more embodiments.

In some embodiments, the lead-in fiber 102 may include a metalized film 112 on at least a portion of the outside surface thereof. For example, the lead-in fiber 102 may include a gold film thereon. The gold film may be provided over the cladding 110, encapsulating the cladding 110, and may include an outer diameter "do" of between about 150 micron and 160 micron in some embodiments, or a film thickness of between about 10 microns to about 20 microns, for example. Other thicknesses and metalized materials may be used. The film material and thickness may be chosen so that the lead-in fiber 102 remains protected from mechanical and chemical damage at high operating temperature (e.g., above 400° C., or even higher for example).

The black body emitter 106 will now be described in detail. The black body emitter 106 may include a bulbous shape including an arcuate profile along its length from the fiber end 104 to a terminal end 114. The arc may be substantially continuous along the length "L". The bulbous shape may have the form of an elongated or stretched sphere. A maximum diameter "dm" of the black body emitter 106 may be less than about 500 microns. The maximum diameter "dm" may be between about 200 microns and about 400 microns, or even between about 300 microns and about 400 microns, in some embodiments. A length "L" of the black body emitter 106 measured between the point where the diameter starts enlarging at the fiber end 104 and the terminal end 114 may be between about 300 microns and about 700 microns, or even between about 400 microns and about 500 microns in some embodiments. A length to maximum diameter ratio (L/dm) may be between about 1.2 and about 2.0, for example. In some embodiments, the black body emitter 106 of the optical fiber temperature sensor 100D may be coated with an end coating 112D, as is shown in FIG. 1D. The coating thickness of the end coating 112D may be between about 10 microns to about 20 microns, for example. Other thicknesses may be used. The end coating 112D may be a gold coating, for example. Other materials may be used.

In one or more embodiments, the melted high emissivity material that is integral with the silica-containing material may include magnesium-alumina silicate. The high emissivity material may further include a copper chromite compound such as copper chromite black spinel, which may provide the black pigment. One suitable high emissivity material is HIE-COAT 840-C and is available from Aremco Products, Inc. of Valley Cottage, N.Y. A coating of the suitable high emissivity material may be applied to a thickness of about 50 microns and then the fiber end 104 may be subjected to intense localized heat to cause the materials to melt and fuse together thus forming the bulbous shape and the melted high emissivity material included integrally in melted silica.

One method that may be used to form the bulbous shape of the black body emitter 106 on the end of the lead-in fiber 102 may be by the use of a fusion splicer 122 (FIG. 1G) that is typically used to splice two optical fibers together. According to one method embodiment, the lead-in fiber 102 is first cleaved. A fusion splicer 122 may be used to melt back the gold coating. In another embodiment, the fiber end 104 may be cleaved after removal of the metalized film 112 (e.g., gold coating) from the fiber end 104. Stripping of the metalized film 112 (e.g., gold coating) may involve immersing the fiber end 104 in molten tin to remove the metalized film 112 (e.g., gold coating). After that, the fiber end 104 may be cleaved to leave about 0.125 inch (about 3 mm) of the fiber end 104 that is stripped. For example, the fiber end 104 may be cleaved using a fiber cleaving device to produce a fiber end 104 that is flat and perpendicular to an axial axis of the lead-in fiber 102, as shown in FIG. 1.

Figure 1F:
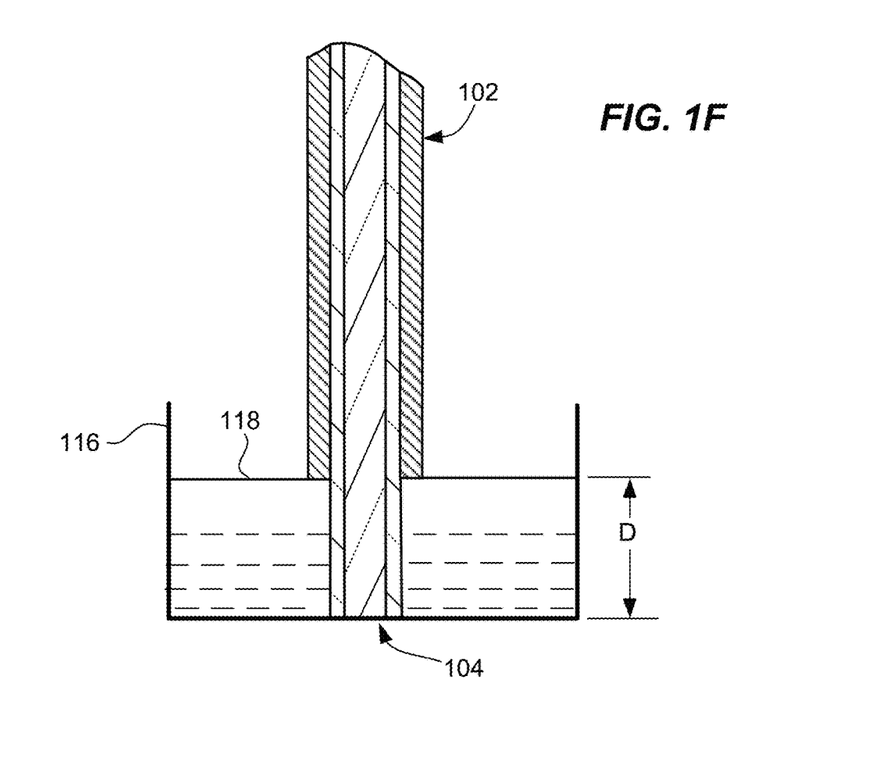
FIG. 1F illustrates a truncated cross-sectioned side view of a lead-in fiber receiving a coating of a high emissivity material according to one or more embodiments.

According to the method, the fiber end 104 may then be dipped into a reservoir 116 containing a high emissivity material 118 (as described above). The high emissivity material 118 may be a mixture of various ceramic materials disbursed in a liquid, such as water. The lead-in fiber 102 may be coated with a coating 120 of the high emissivity material via dipping to a desired depth "d", which may be between about 1 mm and 5 mm. The coating 120 may have a thickness of between about 20 microns and about 100 microns, for example. The coated fiber 102C may then be air dried for about 60 minutes. Other methods of coating and drying may be used.

Figure 1G:
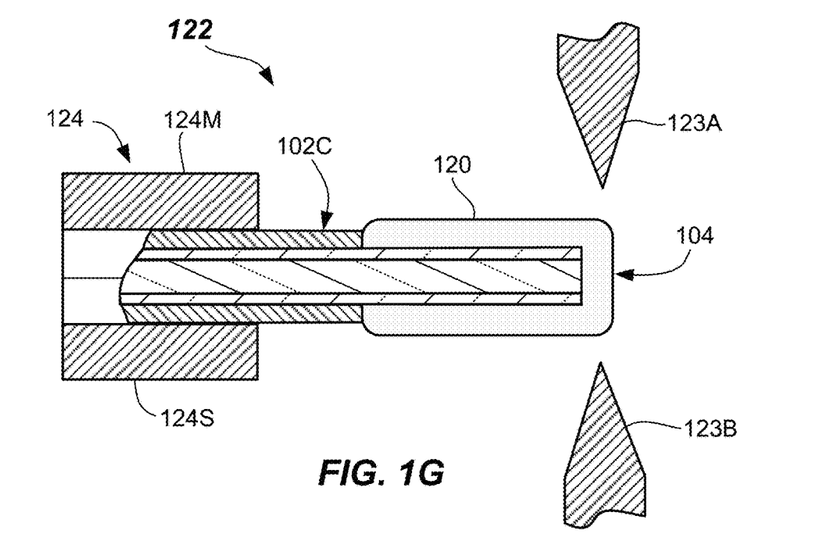
FIG. 1G illustrates a cross-sectioned side view of a coated lead-in fiber mounted in a fusion splicer according to one or more embodiments.

Once dried, as shown in FIG. 1G, the coated fiber 102C is placed in a fusion splicer 122 with the fiber end 104 positioned between the electrodes 123A, 123B of the fusion splicer 122. The coated fiber 102C may also be clamped in place in the fusion splicer 122 by a clamp assembly 124 by securing a moveable clamp 124M against a stationary clamp 124S with the coated fiber 102C in between. Once the coated fiber 102C is clamped in place, an arc may be created between the electrodes 123A, 123B via operation of the fusion splicer 122. Any suitable fusion splicer may work. However, a model 70S fusion splicer available from Fujikura was found to work well. The arc may be applied for about 10 seconds at a standard setting, for example, to cause the formation of the black body emitter 106 wherein the high emissivity material and the materials of the lead-in fiber 102 at the fiber end 104 becomes melted and wherein the high emissivity material is included integrally in and with melted silica.

In the case where the core 108 of the lead-in fiber 102 is made of pure silica and the cladding 110 is doped-silica (e.g., fluorine doped silica), the black body emitter 106, during formation may include portions that include intermixed melted silica, melted fluorine-doped silica, and melted high emissivity material. Other internal areas closer to the fiber end 104 may be mostly silica or doped silica. Upon cooling, the black body emitter 106 includes a glassy appearance as all the materials have melted and re-solidified. The temperature imposed on the fiber end 104 by the fusion splicer 122 may be in excess of about 1700° C. or even higher, for example. The melting point of pure silica core is about 1700° C., whereas the melting point of fluorine-doped silica of the lead-in fiber 102 is somewhat lower. The melting points of various components of one example embodiment of the high emissivity material 118 are as follows:

| Component | Melting temperature |
|---|---|
| Alumino-Silicate | about 1,130° C. |
| Copper Chromite Black Spinel | above 1,000° C. |
| Magnesium Silicate (Hydrated) | about 1,300° C. |
| Silicon Dioxide | about 1,713° C. |

Thus, the fusion splicer 122 produces localized intense heating sufficient to melt all the ceramic components as well as the core 108 and cladding 110 of the coated fiber 102c. Thus, the various components melt and may become intermixed locally in the black body emitter 106 and under surface tension forces take on the form the bulbous shape shown in FIG. 1A. The black body emitter 106 is chemically and thermally stable and mechanically robust.

Figure 2:
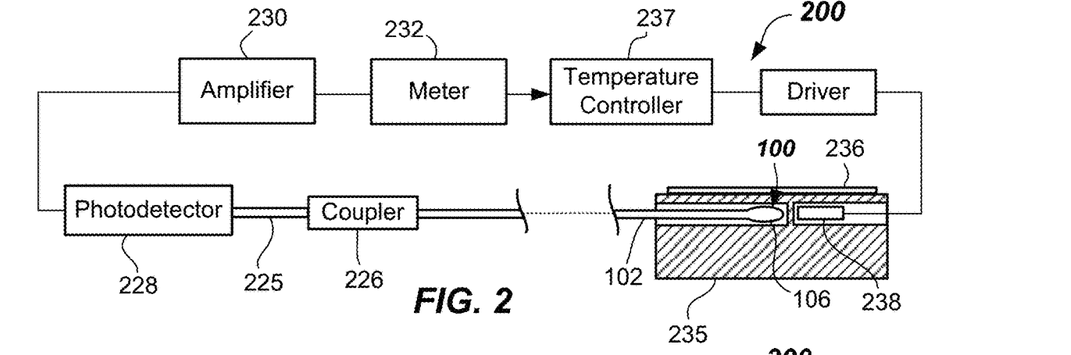
FIG. 2 illustrates a schematic view of a substrate platform temperature control apparatus including a temperature monitoring apparatus containing an optical fiber temperature sensor according to one or more embodiments.

FIG. 2 illustrates a temperature monitoring apparatus 200 according to one or more embodiments. Temperature monitoring apparatus 200 includes the optical fiber temperature sensor 100 as described herein. The lead-in fiber 102 of the optical fiber temperature sensor 100 may be connected to another optical fiber 125 coupled to a photodetector 228. The connection may be made via a fiber coupler 226 or the like. The other optical fiber 225 between the photodetector 228 and the fiber coupler 226 may be an acrylate coated multi-mode optical fiber, for example. Other optical fiber types may be used. The signal(s) from the photodetector 228 may be amplified by amplifier 230 and processed by meter 232. The photodetector 228 may be a photodiode, such as an InGaAs photodiode. A model GAP100-PTS fiber pigtailed InGaAs photodiode available from the GPD Optoelectronics Group works acceptably.

Since the temperature monitoring apparatus 200 is configured to measure a magnitude of light power transferred to the photodetector 228, physical changes to the temperature monitoring apparatus 200, which may interfere with light transmission may affect the temperature measurement. These physical changes may include varying losses at a connector due to relative motion of the fiber end-faces or dirt or scratches on the end faces. The discussed embodiments utilize the optical fiber temperature sensor 100 for thermal control, where measurements of temperature change are more important than measurements of absolute temperature, and thus changes in light transmission that occur on discrete occasions such as disconnecting and connecting the optical fiber temperature sensor 100 do not affect the performance of the temperature monitoring apparatus 200.

In embodiments where more accurate measurement of absolute temperature is desired, the emission from the black body emitter 106 may be characterized by using a two-color ratio method. The two-color ratio method utilizes the temperature-variant spectral density of thermal radiance of an object. Light emitted from black body emitter 106 may be split to a pair of photodetectors (e.g., photodiodes) that are configured with differing spectral sensitivity. Changes in the photodiodes' spectral sensitivities may be achieved by using filters, or by utilizing two different types of photodiodes. The temperature of the black body emitter 106 may be deduced via a computation of the ratio of the measurements of the two photodiodes.

The temperature may be reported and/or manually adjusted, or coupled to a temperature controller 237, which may then automatically adjust the operating power of one or more heating elements 238 (such as resistance or optical fiber heaters) thermally coupled to the substrate platform 235 according to any suitable control algorithm, such as on/off control, proportional control, proportional-integral-derivative (PID) control, or the like.

Figure 3:
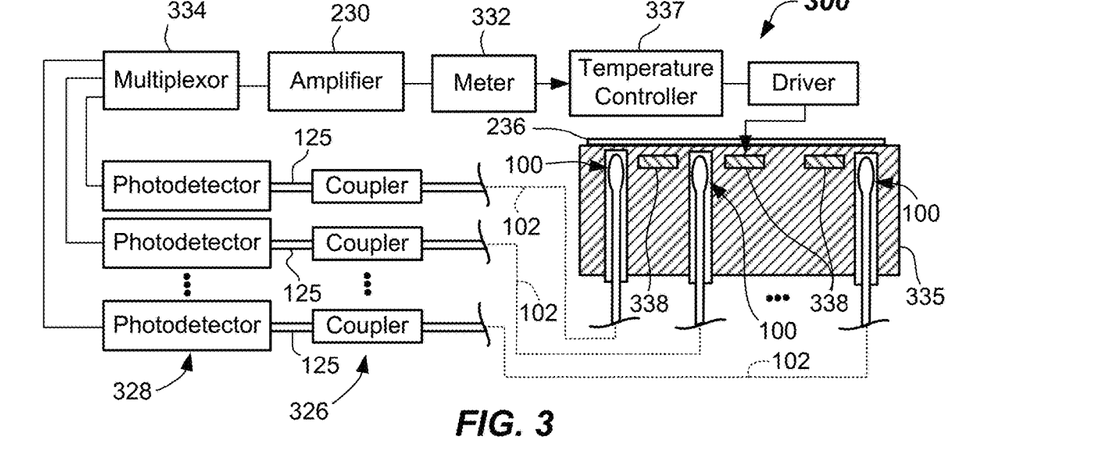
FIG. 3 illustrates a schematic view of a substrate platform temperature control apparatus including a temperature monitoring apparatus containing multiple optical fiber temperature sensors according to one or more embodiments.

FIG. 3 illustrates a temperature monitoring apparatus 300 configured and adapted to measure temperature at more than one location, such as within a substrate platform 335 according to one or more embodiments. Temperature monitoring apparatus 300 includes a plurality of optical fiber temperature sensors 100 as described herein in thermal engagement with a member, such as the substrate platform 335 supporting a substrate 236. The plurality of optical fiber temperature sensors 100 may be received in channels formed in the member or otherwise be in thermal contact therewith. Substrate platform 335 may include one or more heating elements 338 formed therein, such as resistive heater traces. Thus, in some embodiments, the temperature monitoring apparatus 300 may be used with resistive heaters to monitor and possibly control temperature of a member.

The lead-in optical fibers 102 of each of the optical fiber temperature sensors 100 may be coupled to a bank of photodetectors 328 by bank of fiber couplers 326. Optionally connection may be made directly to the photodetectors 328 without fiber couplers 326. The signals emitted from the photodetectors 328 may be supplied to a multiplexor 334 and then amplified, as needed, by amplifier 230. In some embodiments, the signals may be processed by meter 232 according to a processing algorithm such as the two-color method. The photodetectors 328 may be photodiodes, such as InGaAs photodiodes, as described above. The meter 332 may display and/or send a signal of the measured temperatures to the temperature controller 337 to allow adjustment of drive signals to the heating elements 338 based upon the temperature control algorithm used. This allows for temperature control of the member (e.g., substrate platform 335) at more than one location. It should be understood that the temperature monitoring apparatus 200, 300 may be used to monitor and possibly control temperature of any member, not just the substrate platform 235, 335.

Figure 4:
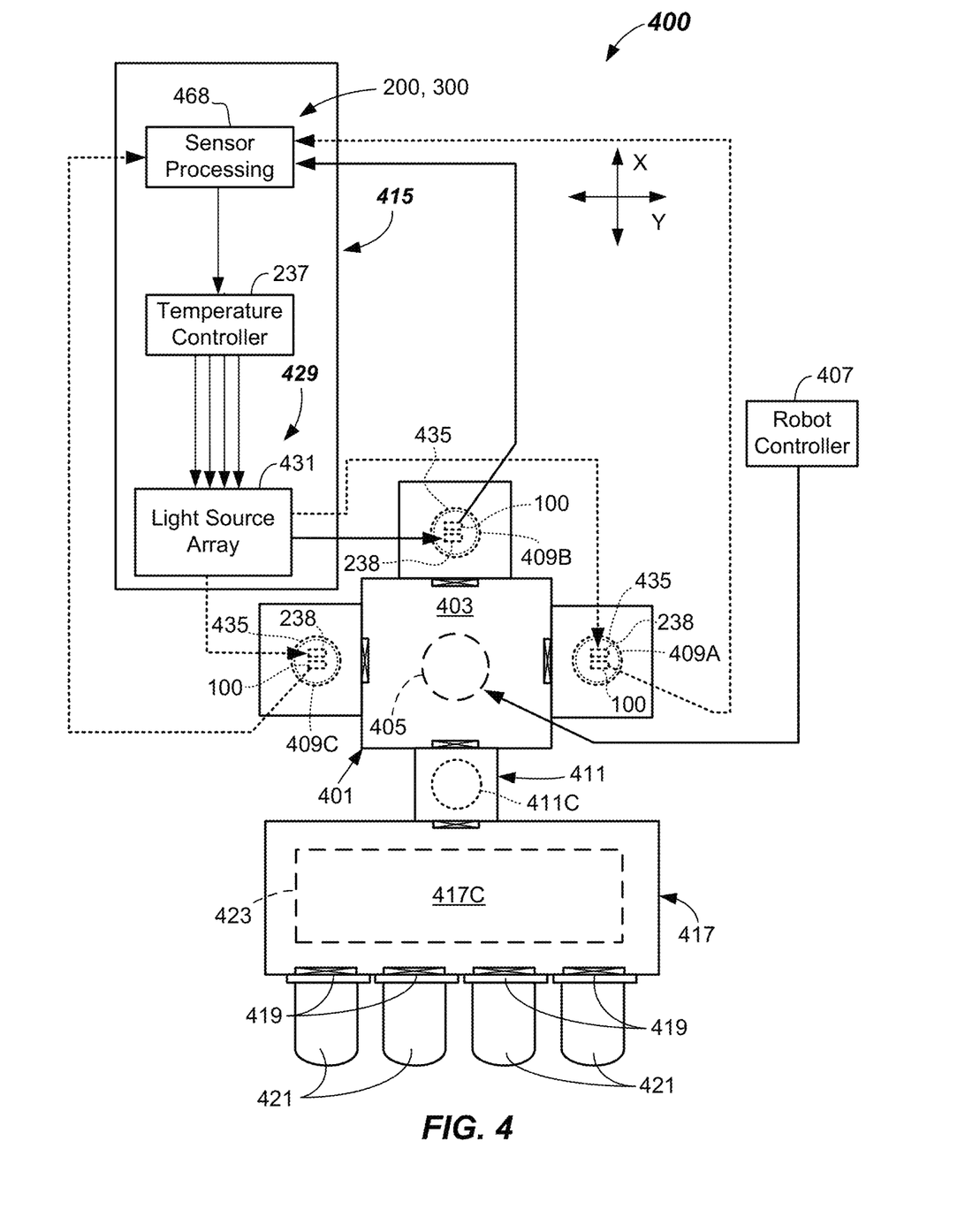
FIG. 4 illustrates a schematic top view of a substrate processing system including a temperature monitoring apparatus containing one or more optical fiber temperature sensors according to one or more embodiments.

FIG. 4 illustrates a schematic top view diagram of an example embodiment of an electronic device processing system 400 including optical fiber heating and temperature monitoring with one or more optical fiber temperature sensors 100 according to one or more embodiments. The electronic device processing system 400 may include a mainframe housing 401 having walls defining a transfer chamber 403. Walls may include side walls, floor, and ceiling, for example. A robot 405 (shown as a dotted circle) may be at least partially housed within the transfer chamber 403. The robot 405 may be configured and adapted to place or extract substrates to and from various destinations via operation of moveable arms of the robot 405. "Substrates" as used herein shall mean articles used to make electronic devices or electrical circuit components, such as silicon-containing wafers or articles, wafer intermediates, patterned or masked silicon wafers or articles, or the like. However, the apparatus, assemblies, systems, and methods described herein may have broad utility wherever high-temperature monitoring and/or control of a substrate is desired. Embodiments of the invention may be useful for controlled high-temperature heating, such as above 500° C., above 600° C., about 650° C., or even higher temperatures.

Robot 405, in the depicted embodiment, may be any suitable type of robot adapted to service the various chambers that are coupled to, and accessible from, the transfer chamber 403. Robot 405 may be a selective compliance assembly robot arm (SCARA) robot or other suitable robot type. For example, robots 405, such as are disclosed in U.S. Pat. Nos. 5,838,121, 6,582,175, 6,379,095, 7,927,062, 8,016,542, and US Pat. Pub. 2010/0178147, and US 2010/0178146, may be used. Other robot types may be used.

The motion of the various arms of the robot 405 may be controlled by suitable commands to a drive motor assembly (not shown) containing a plurality of drive motors from a robot controller 407. Signals from the robot controller 407 may cause motion of the various components of the robot 405 to cause movement of substrates between the process chambers 409A-409C and one or more load lock chambers 411C of a load lock 411. Suitable feedback mechanisms may be provided for one or more of the components by various sensors, such as position encoders, or the like. The robot 405 may include a base that is adapted to be attached to a wall (e.g., a floor or ceiling) of the mainframe housing 401. Arms of the robot 405 may be adapted to be moveable in an X-Y plane (as shown) relative to the mainframe housing 401. Any suitable number of arm components and end effectors (sometimes referred to as "blades") adapted to carry the substrates may be used.

Additionally, the drive assembly of the robot 405 may include Z-axis motion capability in some embodiments. In particular, vertical motion of the arms along the vertical direction (into and out of the paper in FIG. 4) may be provided so as to place and pick substrates to and from the process chambers 409A-409C and the one or more load lock chambers 411C.

In the depicted embodiment, transfer chamber 403 may have one or more process chambers 409A-409C coupled to and accessible therefrom, at least some of which are adapted to carry out high-temperature processing on the substrates inserted therein. The process chambers 409A-409C may be coupled to facets of the mainframe housing 401, and each process chamber 409A-409C may be configured and operable to carry out a suitable process (e.g. a PECVD or other high temperature process) on the substrates. It should be understood that the previously-described temperature monitoring apparatus 200, 300 may be as part of the temperature control apparatus 415 herein.

In the depicted embodiment, the temperature control apparatus 415 includes optical fiber heating and optical fiber temperature monitoring. The temperature control apparatus 415 described herein may have utility for PECVD or other high temperature processes, such as physical vapor deposition, ion implant, or the like. In particular, one or more of the processes taking place in the process chambers 409A-409C may include temperature control via optical fiber heating and temperature monitoring via optical fiber temperature sensors 100 in accordance with one or more embodiments of the invention.

Within the electronic device processing system 400, substrates may be received from a factory interface 417, and also exit the transfer chamber 403 into the factory interface 417 through the load lock chamber 411C of the load lock 411. The factory interface 417 may be any enclosure having wall surfaces forming the factory interface chamber 417C. One or more load ports 419 may be provided on some surfaces of the factory interface 417 and may be configured and adapted to receive (e.g., dock) one or more substrate carriers 421 (e.g., front opening unified pods—FOUPs) such as at a front surface thereof.

Factory interface 417 may include a suitable load/unload robot 423 (shown dotted) of conventional construction within a factory interface chamber 417C. The load/unload robot 423 may be configured and operational to extract substrates from the interior of the one or more substrate carriers 421 and feed the substrates into the one or more load lock chambers 411C of load lock 411, and return the substrates to the one or more substrate carriers 421 after processing.

In accordance with one or more embodiments of the invention, the substrate temperature control apparatus 415 may include one or more heating elements 238 in one or more of the process chambers 409A-409C. As will be apparent from the following, the one or more heating elements 238 may be optical fiber heating elements configured and adapted to provide light-based heating of a substrate. The description herein will focus on providing one or more optical fiber heating elements 238 in process chamber 409B. However, identical one or more optical fiber heating elements 238 may be included in one or both of the other process chambers 409A, 409C. In some embodiments, the one or more optical fiber heating elements may be included in all process chambers 409A-409C. More or less numbers of process chambers including the one or more optical fiber heating elements may be provided. As should be apparent, more than one optical fiber heating element 238 may be coupled to each substrate platform 435.

Referring again to FIG. 4, in some embodiments, optical fiber heating is provided by the substrate temperature control apparatus 415, which is configured to control a temperature of one or more portions of a substrate 236 in thermal engagement with the substrate platform 435 to a desired temperature. Substrate temperature control apparatus 415 may be subpart of the electronic device processing system 400 and may include an optical fiber heating system 429 including optical fiber heating adapted to provide light-based heating that is configured to heat the substrate platforms 435. In one optional embodiment, the optical fiber heating system 429 including optical fiber heating may be configured to operate as a supplemental heating system in conjunction with other thermal elements, such resistive heating elements, for example. In the depicted embodiment, the optical fiber heating system 429 including optical fiber heating may be the only heating system adapted to heat the substrates 236 within the one or more process chambers 409A-409C.

Optical fiber heating system 429 may include a light source array 431 coupled (e.g., optically coupled) to the optical fiber heating elements 238, and a temperature controller 237, which may be an optical controller. The light source array 431 may function as a temperature unit, i.e., the driver that controls the temperature of the optical fiber heating elements 238. Temperature controller 237 is operational to control a temperature of the substrate 236 that is being temperature controlled within the chamber (e.g., process chambers 409A, 409B, and 409C).

Temperature controller 237 may be operational to control channels of the light source array 431 in some embodiments. Thus, the temperature controller 237 may be used to control a temperature of the substrate 236 in thermal contact with the substrate platform 435 that is heated by the one or more optical fiber heating elements 238. Suitable temperature monitoring and feedback may be provided from one or more locations. In some embodiments, the temperature controller 237 may receive temperature feedback from one or more of the optical fiber temperature sensors 100 in thermal contact with the substrate platform 435, as will be explained further herein. Such signals are processed by sensor processing 468.

Figures 5, 6:
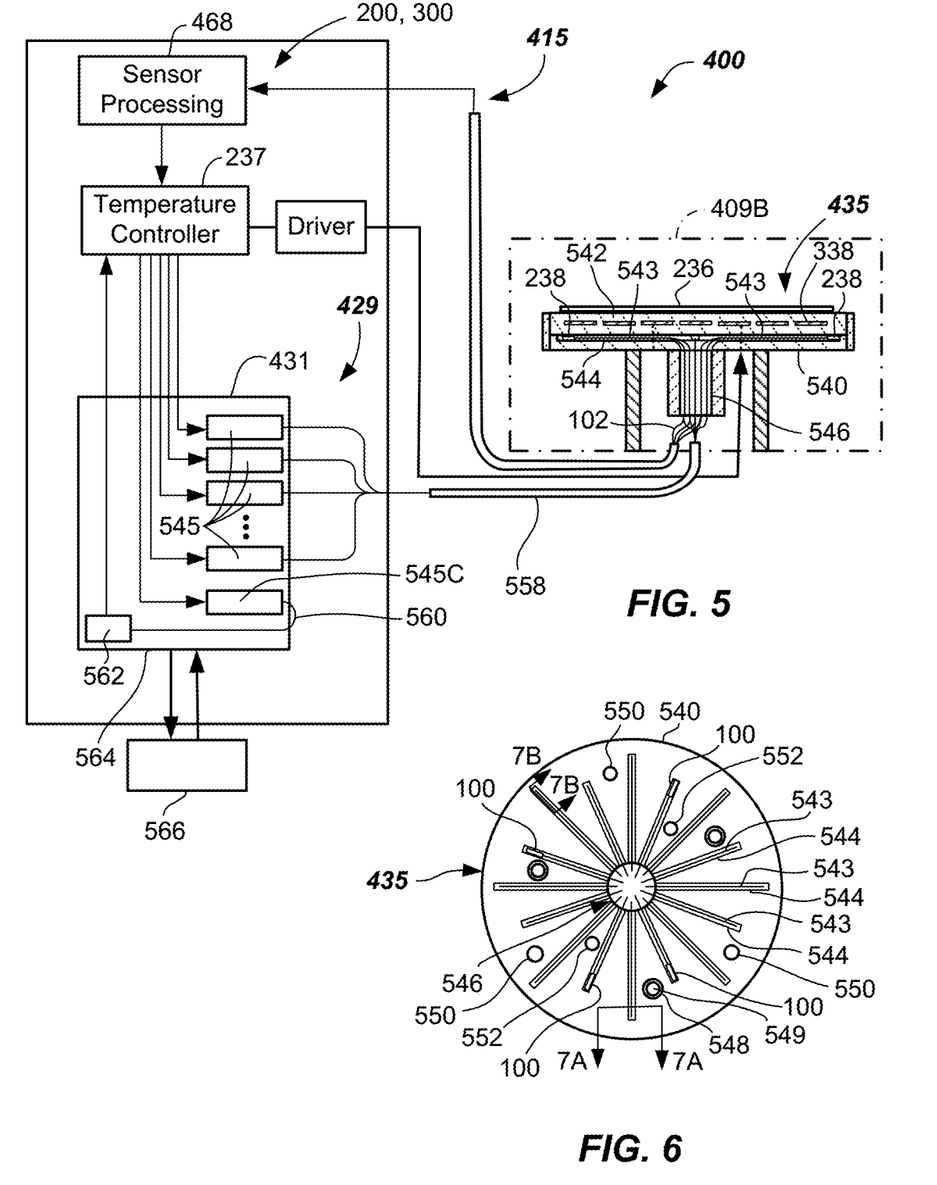
FIG. 5 illustrates a schematic side view of a substrate processing system including a temperature monitoring apparatus containing one or more optical fiber temperature sensors according to one or more embodiments.
FIG. 6 illustrates a top view of a substrate platform including one or more optical fiber temperature sensors according to one or more embodiments.

Now referring to FIGS. 5 and 6, a single process chamber 409B of an electronic device processing system 400 including temperature control apparatus 415 and optical fiber heating system 429 for heating the substrate platform 435, is described in more detail.

Optical fiber heating system 429 may include a substrate platform 435, which may include a support surface upon which the substrate 236 may rest or be in thermal contact with. Substrate platform 435, as shown, may include a lower member 540, and an upper member 542 proximate to the lower member 540. A plurality of grooves 544 are formed in one or more of the lower member 540 and the upper member 542. A plurality of optical fibers 543 which may include optical fiber heating elements 238 adapted to provide light-based heating may be routed and extend within grooves 544. In other embodiments, the optical fiber heating is simply emitted from the end of the optical fiber 543.

As shown, the grooves 544 may be formed in the lower member 540 only in some embodiments. However, it should be recognized that the grooves 544 may be formed in the upper member 542 or in both the lower member 540 and upper member 542. In the depicted embodiment, the upper member 542 is provided in thermal contact with the substrate 236 to control a temperature thereof.

As shown in the depicted embodiment, the plurality of optical fibers 543 may be configured to extend (e.g., laterally) within the grooves 544. Extend laterally, as used herein, means that the length of the optical fiber (along its longitudinal axis) passes horizontally within the grooves 544. Grooves 544 may be oriented to extend substantially parallel to an upper surface plane of the upper member 542. Some slight deviation from parallel is possible due to laying the optical fibers 543 in the grooves 544. The plurality of grooves 544 may be provided in any suitable pattern. One pattern includes a plurality of radial spokes, as shown in FIG. 6. Other suitable patterns of grooves 544 may be used.

The plurality of optical fibers 543 which may include optical fiber heating elements 238 are adapted to provide light-based heating of the substrate 236. The plurality of optical fibers 543 may terminate at multiple radial locations in the grooves 544 (see FIG. 6, for example). Optical fibers 543 may pass through the lower member 540 as a bundle (e.g., as a group of fibers) and then bend and extend (e.g., laterally) within the grooves 544. Optical fiber heating system 429 may include the light source array 431 including a plurality of light sources 545 coupled to at least some, and preferably most or all, of the plurality of optical fibers 543. The temperature controller 237, which may include an optical controller, may include multi-channel control configured to control light power (e.g., intensity) channeled into, and carried by, the plurality of optical fibers 543 individually or zonally.

In operation, light carried in at least some of the plurality of optical fibers 543 is used to heat local portions of the underside of the upper member 542, and thus by at least conduction, the substrate 236. When the plurality of optical fibers 543 are bent, positioned and terminated at desired locations, many local portions of the upper member 542 may be heated.

In some embodiments, this localized light-based heating may be provided in conjunction with temperature control provided by auxiliary heating provided by heater driver and one or more heating elements 338 (e.g., resistive traces embedded in the upper member 542). In other embodiments, the localized (e.g. pixelated) heating by the plurality of optical fibers 543 or optical fiber heating elements 238 may be the only heating provided to the upper member 542.

In operation, temperature control apparatus 415 may, in some embodiments, cause the substrate 236 to be heated to a nominal temperature of greater than about 500° C., greater than about 550° C., greater than about 600° C., or even about 650° C., or a greater temperature. For example, temperature control may, in some embodiments, cause the substrate 236 to be heated to a nominal temperature of between about 600° C. and about 700° C. Such heating may be carried out on substrates 236 within the one or more process chambers 409A-409C in some embodiments. For example, temperature control apparatus 415 may, in some embodiments, cause the substrate 236 to be heated, such as in a PECVD process.

In some embodiments, the heating elements 338 may provide a primary heating source to heat the upper member 542 to a nominal temperature, and the optical fiber heating system 429 may provide assistive or supplemental heating sources, such that the nominal temperature may be further adjusted between bounds, such as between about +/−10° C. from a nominal temperature, between about +/−20° C. from the nominal, or even between about +/−30° C. from the nominal, for example. Other temperature adjustment magnitudes may be accomplished by using the optical fibers 543 or optical fiber heating elements 238 that are more or less powerful (having more or less light output power). Thus, in accordance with one or more embodiments of the invention, temperature control may be implemented by the optical fiber heating on a pixelated basis, i.e., to multiple locations of the substrate platform 435.

Some of the optical fibers 543 may include various optical features or structures at their fiber termination which function as optical fiber heating elements 238, including a diffuse emitter, a lensed tip, or an angled cleave, or other structure. Such optical features may be used to direct light to one or more surfaces of the diffuser or otherwise minimize light reflection back into the optical fiber 543. Some such optical features are described more fully in U.S. patent application Ser. No. 14/738,448, filed Jun. 12, 2015, and entitled "APPARATUS, SYSTEMS, AND METHODS FOR TEMPERATURE CONTROL OF SUBSTRATES USING EMBEDDED FIBER OPTICS AND EPOXY OPTICAL DIFFUSERS."

Operation of the optical fiber heating system 429 will now be described. For example, if the nominal desired temperature of the substrate 236 is about 650° C., but geometrical or thermal anomalies or other differences in the process chamber 409B or the design of the upper member 542 and lower member 540 make it difficult to achieve that nominal temperature across all parts of the substrate 236, then the supplemental heating may be provided by the optical fiber heating system 429 in addition to any heat provided by the coupled heating elements 338. Light-based heating may be provided, in one or more embodiments, by the optical fiber heating system 429 to adjust localized regions in order to meet any desired temperature profile. In some embodiments, optical fiber heating system 429 may be used to adjust localized regions to provide a substantially uniform temperature profile of the substrate 236. However, the desired temperature profile may be made intentionally non-uniform in some embodiments. Thus, it should now be apparent that the optical fiber heating system 429 may adjust temperature of localized regions by adjusting the light intensity to individual optical fibers 543 or optical fiber heating elements 238, either individually to control individual pixels or zonally to control zones or regions of the substrate 236.

In more detail, the lower member 540 may be a ceramic material, such as aluminum nitride. The lower member 540 may also include one or more passages 546 (e.g., one or more bores). In the depicted embodiment, a single passage 546 that may be centrally located is provided. The passage 546 may extend through a transition leg and route the optical fibers 543 into the grooves 544. For example, the plurality of optical fibers 543 may enter, as a bundle, though the passage 546 and then the one or more optical fibers 543 may be routed into the various grooves 544, such as shown in FIG. 6. In some embodiments, a single optical fiber 543 may be received in each groove 544. In other embodiments, multiple optical fibers 543 may be received in one or more of the grooves 544.

Secondary passages 548 may be included through the lower member 540 and upper member 542 to accommodate lift pins 549 in some embodiments. In one or more embodiments, other passages 550 may be used to accept one or more of the optical fiber temperature sensors 100. The other passages 550 may terminate in the lower member 540, or extend into the upper member 542. In other embodiments, some or all of the optical fiber temperature sensors 100 may extend in some of the grooves 544. Additionally or optionally, third passages 552 may be included in some embodiments to pass electrical wires to the heating elements 338, if present. Third passages 552 may also or optionally be used to pass wires to electro-static chuck elements, if present.

Optical fibers 543 may be of various suitable lengths and may extend to various desired termination locations within the grooves 544. Grooves 544 may be of different lengths as shown in FIG. 6, and may have any suitable groove shape. In some embodiments, the grooves 544 may emanate from the one or more passages 546 and be straight, whereas others may emanate from the one or more passages 546 and may be curved, circular, or even serpentine. Combinations of straight, curved, circular, and serpentine portions may be used to construct each groove 544. Grooves 544 may also have any suitable cross-sectional shape.

Figure 7A:
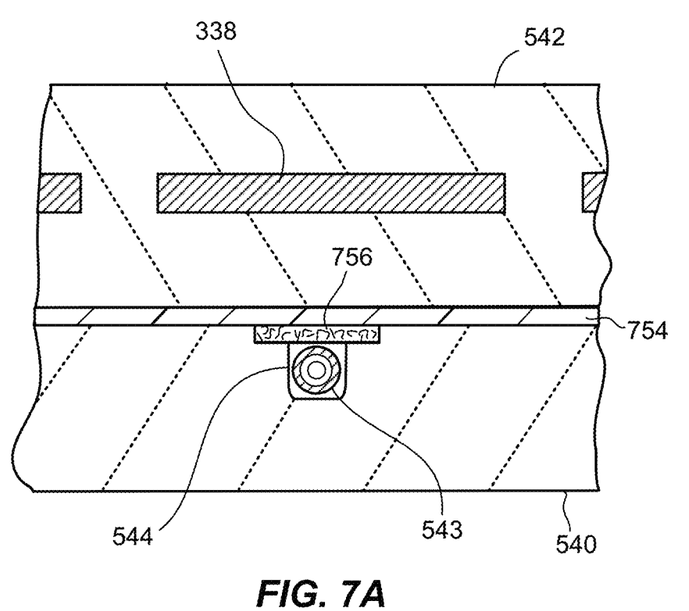
FIGS. 7A and 7B illustrate partial cross-sectioned side views of a substrate platform including an optical fiber heater according to one or more embodiments.

FIG. 7A illustrates an enlarged partial cross-sectional view taken along section line 7A-7A in FIG. 6, and illustrating the optical fiber 543 and heating element 238 (if present) received in a groove 544. As shown, a bonding material 754 may be provided to bond the upper member 542 to the lower member 540. The shape of the groove 544, as shown, may be generally rectangular in cross-section. However, other cross sectional shapes may be used, such as half round, trapezoidal, or the like. Grooves 544 may be formed in the lower member 540 by any suitable machining means, such as laser machining, abrasive water jet cutting, grinding or milling with diamond tools, and the like. The grooves 544 may be larger in width than a width of the optical fiber 543 so that the optical fiber 543 may not undergo stress due to thermal expansion mismatch. For example, the width of the groove 544 may be about 1 mm greater or more than an outer dimension of the optical fiber 543 or group (e.g., bundle) of optical fibers 543 that are routed within the respective groove 544. For example, the dimensions of the grooves 544 may be between about 1 mm and 3 mm wide, and between about 1 mm and 3 mm deep. Other dimensions may be used. In some embodiments, the heat provided by the optical fibers 543 or optical fiber heating elements 238 may be supplemented by optical heating elements 338.

As shown in FIG. 6, one or more grooves 544 may include optical fiber temperature sensors 100 routed therein. In some embodiments, both an optical fiber 543 and a lead-in fiber 102 may be routed in the grooves 544.

The number of grooves 544 may number 20 or more, and between about 50 and 500 in some embodiments, such as when a single optical fiber 543 or lead-in fiber 102 is received in each groove 544. In some embodiments, where multiple optical fibers 543 or lead-in optical fibers 102 are received in each groove 544, between about 5 and about 50 grooves 544 may be provided. Thus, depending on the design, between about 5 and about 500 grooves 544 may be provided, for example. In some embodiments receiving optical fibers 543, a coating may be applied to the interior of one or more of the grooves 544 to improve light absorption. For example, a black-colored high temperature coating suitable for high temperature service (e.g., above 650° C.) may be used.

In some embodiments, a barrier 756 may be provided between the optical fiber 543 and the bonding material 754. For example, in FIGS. 7A-7B, the barrier 756 may be provided within or on the groove 544 and along a length of the optical fiber 543 (or lead-in fiber). In other embodiments, the barrier 756 may be provided in the groove 544 and may be a sheath or sleeve of material that may loosely surround the optical fiber 543 (or lead-in fiber 102) along its length. In other embodiments, the barrier 756 may be a powder that surrounds at least a portion of the optical fiber 543 (or lead-in fiber 102). The powder may be a silicon carbide powder material, for example. However, the barrier 756 may be any suitable material that prevents the bonding material 754, which may be a braze foil or glass frit or the like, from coming into contact with the optical fibers 543 or lead-in fiber 102. This allows the optical fibers 543 or 102 to move within (e.g., longitudinally) in the groove 544 as the lower member 540 heats up.

Figure 7B:
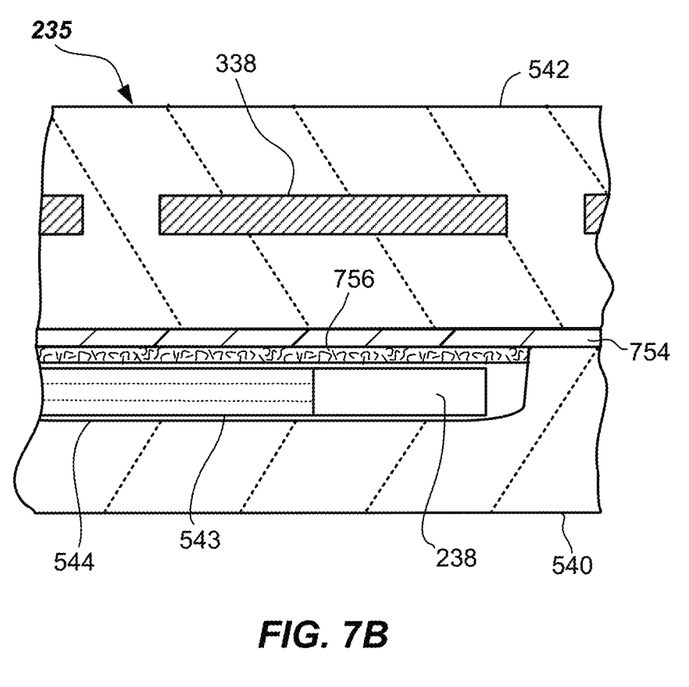

In one or more embodiments, the barrier 756 may be a woven, braided, or fibrous ceramic cloth or paper. Other materials such as fiberglass or powdered ceramics, such as powdered silicon carbide, may be used. Other suitable high-temperature materials may be used for the barrier 756. Depending upon the configuration used the barrier 756 and/or the optical fibers 543 and/or 102 may be adhered to the groove 544 or the barrier 756 with a suitable organic adhesive. For example, in some embodiments, an ultraviolet (UV) curable epoxy adhesive may be used to secure the optical fiber 543 and/or 102 in the groove 544. An ultraviolet (UV) curable epoxy adhesive may also be used to secure the barrier 756 in some embodiments. It is desired that the organic adhesive be thermally removed during subsequent processing or operation. Other means for securing the optical fibers 543 and/or lead-in fiber 102 in the grooves 544 may be used. For example, the optical fibers 543 and/or lead-in fiber 102 may be held in place within the grooves 544 by clips, such as metal clips or springs formed from a high temperature metal (e.g., such as Inconel 750). In other embodiments, the optical fibers 543 and/or 102 may be held in place by plastic tubing inserted in the grooves 544. Tubing may be made of PTFE, which can be pyrolized at a temperature of about 400° C. and about 500° C. In some embodiments, optical fibers 543 and/or 102 may be held in place by plastic shims or by a hot-melt thermoplastic adhesive such as CRYSTALBOND 555 available from Aremco Products Inc. of Valley Cottage, N.Y., which can be removed from the assembly with hot water.

In some embodiments, optical fibers 543 and/or lead-in fiber 102 may be combined into bundles with heat shrink tubing to ease assembly. The heat shrink tubing may be constructed from PTFE, which can be removed by pyrolization. In some embodiments, optical fibers 543 and/or 102 may be routed to grooves 544 or within the grooves 544 using capillary tubing constructed of a suitable high temperature metal (e.g., metal or metal alloy), for example.

In the depicted embodiment of FIGS. 5 and 6, the optical fibers optical fibers 543 and/or lead-in fiber 102 may pass through the passage 546 as a bundle and may be constrained or fixed within the passage 546. For example, bundle of optical fibers 543 and/or lead-in fiber 102 may be potted with a potting material provided within the passage 546, such as with a ceramic adhesive. One suitable ceramic adhesive is CERAMACAST 865 available from Aremco Products Inc. of Valley Cottage, N.Y. Other suitable potting materials may be used. Potting material may be located at a bottom, top, middle, or all along the passage 546. Potting material operates to secure the optical fibers 543 and/or lead-in fiber 102 in place in the passage 546. In some embodiments, the bundle of optical fibers 543 and/or lead-in fiber 102 may be constrained in a sleeve and/or metal capillary tube.

Upper member 542 may also be a ceramic material, such as an aluminum nitride ceramic, like the lower member 540. The optical fibers 543 and/or lead-in fiber 102 may be laid in the grooves 544 and extend (e.g., laterally) to heat various underside portions of the upper member 542. In some embodiments where the optical fibers 543 and/or 102 are inserted in the grooves 544 before bonding, glass frit or a metal braze may be used to join the upper member 542 to the lower member 540. One possible braze is by using a copper-silver braze material, which can be brazed at a temperature of about 850° C. In another example, a glass frit powder may be used. The frit powder may be adjusted by adding fillers and adjusting glass chemistry to match the CTE of the ceramic material used for the upper member 542 and lower member 540 and provides a suitable melting point. Bond thickness of the bonding material 754 may be between about 0.3 mm to about 0.5 mm, for example.

In some embodiments, a radial edge of substrate platform 235 may include a protective layer of an etch-resistant material. The protective layer may be made of any material that resists etching by the gases or other material present within the process chamber 409B. For example, the protective layer may be a Yttrium oxide (Yttria) material, which may be applied by a spraying process (e.g., plasma spraying). Other suitable application processes may be used. The protective layer may offer protection for the layer of bonding material 754, especially from fluorine-based cleaning chemicals that may be used in the process chamber 409B.

The upper member 542 may, in some embodiment, include the heating elements 338 imbedded therein. The heating elements 338 may provide single-zone heating or dual-zone heating in some embodiments, and may be configured vertically above the location of the optical fibers 543 and/or lead-in fiber 102, or below the location of the fibers in some embodiments. The heating elements 338 may provide a majority of the heat and the light-based heating provided by the optical fibers 543 may provide localized heating supplements to provide the capability of making local temperature adjustments adjacent to the terminations locations.

In the depicted embodiments of FIGS. 2-5, the temperature controllers 237, 337 may be any suitable controller having a processor, memory, and peripheral components adapted to execute a closed loop or other suitable control scheme and control the power (e.g., Watts) emanating from each of the heating elements 238, 338. In the case of the optical fiber heating system 429, at least some of the light sources 545 are coupled to the optical fibers 543 and provide optical power thereto (e.g., infrared energy). Optical fibers 543 may be arranged in a bundle (as shown) and may include a protective sheath 558 over at least some of the length as they are routed to the lower member 540. Protective sheath 558 may be a stainless steel tube in some embodiments. Other suitable sheath materials may be used.

Optical fibers 543 may include any suitable optical fiber type, such as graded-index optical fiber, step-index single mode optical fiber, multi-mode optical fiber, or even photonic crystal optical fiber. Optical fibers 543 that exhibit relatively high bend resistance may be used. Relatively high numerical aperture (NA) fibers may be used, such as NA of greater than about 0.1, greater than about 0.2, or even greater than about 0.3. Any suitable number of optical fibers 543 may be used, such as 20 or more, 50 or more, 100 or more, 200 or more 300 or more, 400 or more, and even up to 500 or more. The termination of the optical fibers 543 may be located below the upper surface of the upper member 542 by a distance of between about 0.125 inch (about 3.2 mm) and about 0.5 inch (12.3 mm). Other vertical locations are possible.

In some embodiments, the optical fibers 543 may each include a metal film on an outer surface thereof. Depending on the operating temperature, aluminum, copper or gold may be used for the metal film. At temperature around 650° C., gold may be used for the metal film. The metal film may be about 15 microns thick, for example. Other thicknesses may be used.

The optical fibers 543 that extend to the lower member 540 in the protective sheath 558 from the light source array 431 may comprise standard polymer-coated optical fibers (e.g., acrylate or acrylate-epoxy polymer coating). The metal-coated optical fibers may be spliced to the polymer-coated optical fibers at a point below the lower member 540, for example.

In one or more embodiments, one or more of the light sources 545C may be coupled by a sensor fiber 560 to a control sensor 562, such as a light receiver (e.g., photodiode) to provide a reference power signal to the temperature controller 237. Each light source 545 may be a laser diode, such as a single emitter diode. The laser diode may have any suitable output wavelength range, such as between about 915 nm and about 980 nm, for example. Other output ranges may be used. Output power may be modulated between about 0 W to about 10 W. However, ever higher power diodes (e.g., >10 W) may be used. The laser diode may include an optical fiber output having a 105 or 110 micron core diameter, for example. For example, a model PLD-10 from IPG Photonics of Oxford, Mass. may be used. Other types of light sources 545 may be used. According to embodiments, between about 20 and about 500 light sources 545 may be used. As shown, the light sources 545 may be rest upon or be in thermal engagement with a heat sink 564, which may be cooled (e.g., liquid cooled) such as to between about 20° C. and about 30° C. by a cooling source 566. Cooling source 566 may be a source of chilled water, for example. Other types of cooling sources 566 may be used.

A control sensor 562 may be used to provide feedback to the temperature controller of a relative output of the control light source 545C (e.g., of light intensity or heat generation, for example).

Further, and as shown in FIGS. 4, 5 and 6, one or more optical fiber temperature sensors 100 may be provided in one or more of the substrate platforms 235, 335, 435. For example, as described above, the one or more optical fiber temperature sensors 100 may be provided in one or more channels, such as grooves 544 and/or in the other passages 550, or otherwise in thermal contact with the one or more substrate platforms 235, 335, 435.

The one or more optical fiber temperature sensors 100 are part of a temperature monitoring apparatus 200, 300 configured to enable localized temperature monitoring of one or more portions of the members (e.g., substrate platforms 235, 335, 435). The temperature monitoring apparatus 200, 300 may include sensor processing 468. Sensor processing 468 may include photodetector 228 or a bank of photodetectors 328 for reading the emitted radiation at one or more wavelength, one or more amplifiers 230 for amplifying the signal if needed, and optionally a meter 232 configured to provide a useful output of the monitored temperature in digital form, for example. Sensor processing 468 may include a fiber multiplexer or other like component if multiple optical fiber temperature sensors 100 are used.

Thermal measurement may be accomplished by coupling the lead-in fiber(s) 102 to the photodetector(s) 228, 328 of the sensor processing 468. Although a system including a meter 332 is shown, any suitable sensor processing may be used to interrogate the optical fiber temperature sensor 100. The temperature monitoring apparatus 200, 300 may interface with the temperature controller 237 to provide temperature feedback thereto.

Any suitable temperature control philosophy may be implemented with the optical fiber heating system 429. In one control aspect, a highly uniform temperature distribution across an upper surface of the substrate 236 may be sought. In another aspect, a deliberately non-uniform temperature distribution may be desired (e.g., hotter or cooler at an edge of the substrate 236). Each temperature profile may be provided, as desired, in accordance with aspect of the invention depending on the control philosophy implemented by the temperature controller 237. Some embodiments of the invention may therefore provide azimuthal temperature variations.

Further descriptions of optical fiber heating, grooves and groove patterns for optical fiber heaters may be found in U.S. patent application Ser. No. 14/299,850 filed Jun. 9, 2014, and entitled "SUBSTRATE TEMPERATURE CONTROL APPARATUS INCLUDING OPTICAL FIBER HEATING, SUBSTRATE TEMPERATURE CONTROL SYSTEMS, ELECTRONIC DEVICE PROCESSING SYSTEMS, AND METHODS", and U.S. patent application Ser. No. 14/737,799, filed Jun. 12, 2015, and entitled "TEMPERATURE CONTROL APPARATUS INCLUDING GROOVE-ROUTED OPTICAL FIBER HEATING, SUBSTRATE TEMPERATURE CONTROL SYSTEMS, ELECTRONIC DEVICE PROCESSING SYSTEMS, AND PROCESSING METHODS," each of which is hereby incorporated by reference herein in its entirety for all purposes.

Figure 8:
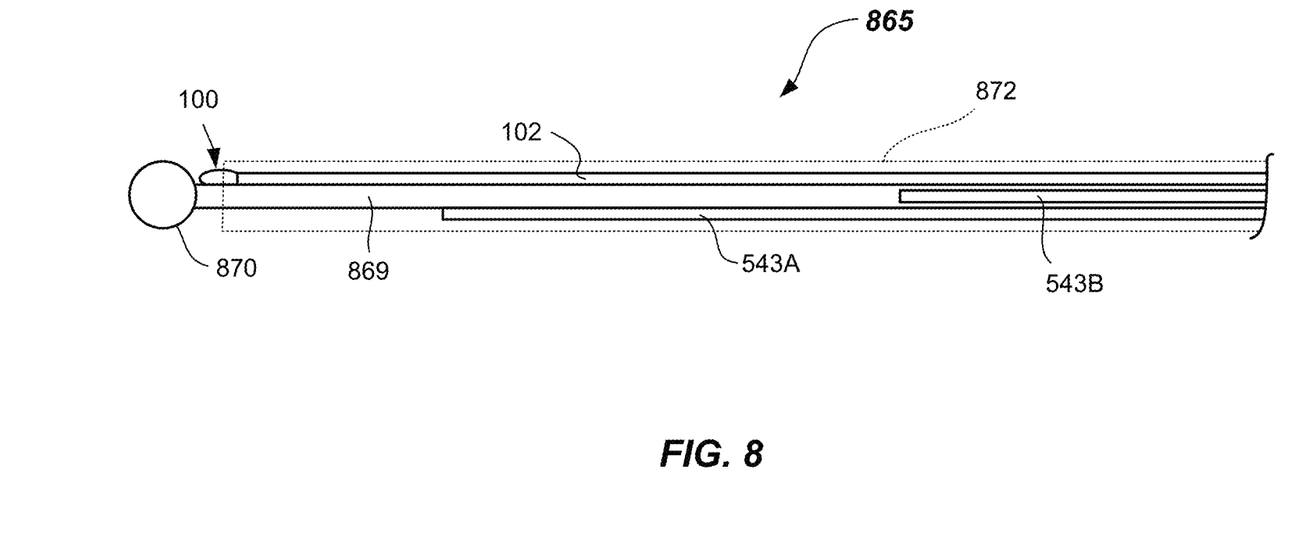
FIG. 8 illustrates a partial cross-sectioned side view of an optical fiber heater/sensor assembly including one or more optical fiber heaters and one or more optical fiber temperature sensors according to one or more embodiments.

As shown in partial side view of FIG. 8, a sensor/heater assembly 865 of one or more optical fiber heaters and one or more optical fiber temperature sensors 100 is shown. Optical fibers 543A, 543B, etc., may be inserted into the grooves 544 after the upper member 542 has been bonded to the lower member 540 in some embodiments. Because the optical fibers 543A, 543B, etc. are not installed at the time of bonding the upper member 542 to the lower member 540, higher temperature bonding processes may be used (e.g., diffusion bonding process). Diffusion bonding takes place around 1,800° C., which is above the melting temperature of the optical fibers (about 1,300° C.-1,700° C.), and may provide a higher bond strength.

To accomplish insertion into the grooves 544 after bonding, multiple optical fibers (e.g., optical fibers 543A, 543B, etc. shown), which may be metal-filmed (e.g., gold-filmed) optical fibers as previously described, may be bundled into a sensor/heater assembly 865 as shown in FIG. 8. The sensor/heater assembly 865 may a pusher wire 869 with a guide member 870, such as a spherical-shaped plastic tip formed thereon. Other types of guide members 870 may be used. This pusher wire 869 with a guide member 870 provides the stiffness and guiding capability in order to thread the sensor/heater assembly 865 into the grooves 544.

Optical fibers 543A, 543B, etc. and one or more optical fiber temperature sensors 100 are shown bundled around the pusher wire 869, with the terminal ends of the optical fibers 543A, 543B, etc. and the optical fiber temperature sensors 100 being staggered along a length of the sensor/heater assembly 865. Heat shrink tubing 872 (shown dotted) may be used to secure the components of the sensor/heater assembly 865 together. Other means, such as a suitable adhesive, may be used for bundling together the sensor/heater assembly 865.

The pusher wire 869 may be made of a high temperature alloy, such as Inconel 600, suitable for operation at high temperature (e.g., about 650° C.). The pusher wire 869 may be gold plated, so to reflect laser energy back to the surrounding ceramic material of the upper member 542 and lower member 540. The heat shrink tubing 872 and guide member 870 may be made of PTFE, which can be pyrolized during the high temperature bond process or in a separate removal process. The pyrolization process has the benefit of completely eliminating the PTFE material.

In one or more embodiments, the optical fibers 543A, 543B, etc. of the sensor/heater assembly 865 may include angled cleaves (e.g. 45 degrees) so the laser energy fires off to a side. Each individual optical fiber 543A, 543B, etc. may point up, down, or to the side. Two optical fibers (e.g., fiber 543A, 543B) are shown in the depicted embodiment. However, about two to about fifty optical fibers or even two to a hundred may be included in each sensor/heater assembly 865. About five to about twenty optical fibers may be preferable in each fiber heater/sensor assembly 865.

Figure 9:
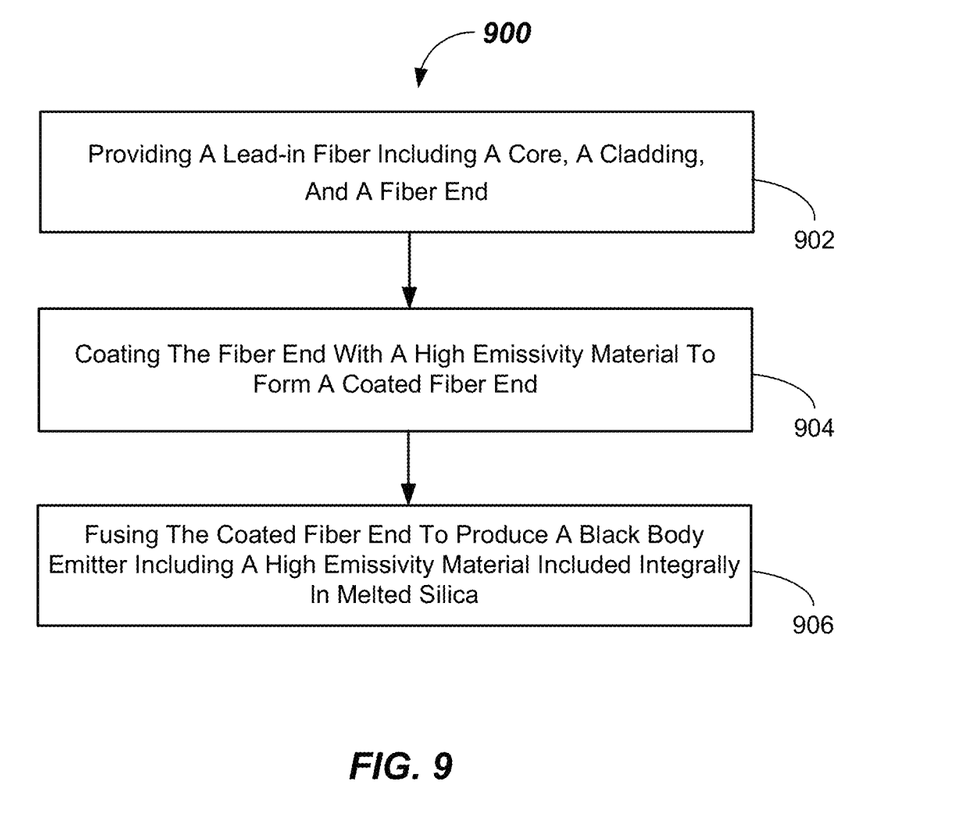
FIG. 9 illustrates a flowchart depicting a method of manufacturing an optical fiber temperature sensor according to embodiments.

A method of manufacturing optical fiber temperature sensors (e.g., optical fiber temperature sensors 100) will be described with reference to FIG. 9 herein. The method 900 includes, in 902, providing a lead-in fiber (e.g., lead-in fiber 102) including a core (e.g., core 108), a cladding (e.g., cladding 110) and a fiber end (e.g., fiber end 104). The method 900 includes, in 902, coating the fiber end (e.g., fiber end 104) with a high emissivity material (e.g., high emissivity material 118). Coating may be by dipping, painting, or the like. Once the coating is dried, the method 900 includes, in 906, fusing the fiber end (e.g., fiber end 104) with high intensity heat to produce a black body emitter (e.g., black body emitter 106) including melted high emissivity material included integrally in melted silica. The term "melted" as used herein means that the melting point of the material has been exceeded during formation of the black body emitter 106, even though the material in use as an optical fiber temperature sensor 100 is solidified melt-formed material.

As discussed above, the fusing in 906 may involve the use of a fusion splicer (e.g., fusion splicer 122), however any suitable device or mechanism for causing intense heat above the respective melting points to cause fusion of and formation of the black body emitter 106 comprised of melted high emissivity material included integrally in melted silica may be used. "Melted high emissivity material included integrally in melted silica" means that during formation, the high emissivity material has melted with the silica to form a globule, reformed in shape, of solidified melt-formed material. The term "melted" in this context means that materials making up the black body emitter 106 exceeded their melting temperatures during the formation of the black body emitter 106, but are now solidified in final form, i.e., effectively melted and re-solidified.

The foregoing description discloses only example embodiments of the invention. Modifications of the above-disclosed optical fiber temperature sensor, temperature monitoring apparatus, systems, and methods which fall within the scope of the invention will be readily apparent to those of ordinary skill in the art. Accordingly, while the present invention has been disclosed in connection with example embodiments, it should be understood that other embodiments may fall within the scope of the invention, as defined by the following claims.

What is claimed is:

1. An optical fiber temperature sensor, comprising:
a lead-in fiber including a fiber end; and
a black body emitter fused on the fiber end, the black body emitter comprising a continuously arcuate profile along its entire length and including melted high emissivity material included integrally in melted silica, wherein the black body emitter comprises a first portion having a first composition comprising an intermixture of the melted silica, melted fluorine-doped silica and the melted high emissivity material, and wherein the black body emitter further comprises a second portion having a second composition comprising a majority silica or doped silica.

2. The optical fiber temperature sensor of claim 1, wherein the lead-in fiber comprises multimode optical fiber.

3. The optical fiber temperature sensor of claim 2, wherein the lead-in fiber comprises a core having a diameter between about 100 microns and 110 microns.

4. The optical fiber temperature sensor of claim 2, wherein the lead-in fiber comprises a cladding having a diameter between about 120 microns and 130 microns.

5. The optical fiber temperature sensor of claim 2, wherein the melted high emissivity material comprises a magnesium alumina silicate.

6. The optical fiber temperature sensor of claim 2, wherein the melted high emissivity material comprises copper chromite.

7. The optical fiber temperature sensor of claim 1, wherein the lead-in fiber includes a metalized film.

8. The optical fiber temperature sensor of claim 7, wherein the lead-in fiber includes a gold film.

9. The optical fiber temperature sensor of claim 1, wherein the melted high emissivity material of the black body emitter comprises magnesium-alumina silicate.

10. The optical fiber temperature sensor of claim 1, wherein the black body emitter comprises a maximum diameter of less than about 500 microns and a length to maximum diameter ratio of 1.2 to less than 2.

11. The optical fiber temperature sensor of claim 1, wherein the black body emitter comprises a maximum diameter of between about 200 microns and about 400 microns.

12. The optical fiber temperature sensor of claim 11, wherein the maximum diameter is between about 300 microns and about 400 microns.

13. The optical fiber temperature sensor of claim 1, wherein the black body emitter comprises a length of between about 300 microns and about 700 microns.

14. The optical fiber temperature sensor of claim 13, wherein the length is between about 400 microns and about 500 microns.

15. The optical fiber temperature sensor of claim 1, wherein the black body emitter is additionally coated with a metal coating.

16. The optical fiber temperature sensor of claim 1, comprising operating capability of greater than 600° C.

17. A temperature monitoring apparatus, comprising:
a substrate platform;
a channel formed in the substrate platform; and
an optical fiber temperature sensor received in the channel, the optical fiber temperature sensor including:
a lead-in fiber including a fiber end, and
a black body emitter fused on the fiber end, the black body emitter comprising a continuously arcuate profile along its entire length and including a melted high emissivity material included integrally in melted silica, wherein the black body emitter comprises a first portion having a first composition comprising an intermixture of the melted silica, melted fluorine-doped silica and the melted high emissivity material, and wherein the black body emitter further comprises a second portion having a second composition comprising a majority silica or doped silica.

18. The temperature monitoring apparatus of claim 17, further comprising:
an additional optical fiber coupled to the lead-in fiber;
a photo detector coupled to the additional optical fiber;
an amplifier coupled to the photo detector to amplify a signal from the photo detector; and
a meter to process the amplified signal.

19. The temperature monitoring apparatus of claim 17, wherein the lead-in fiber comprises a pure silica core and a doped-silica cladding.

20. The optical fiber temperature sensor of claim 1, wherein the lead-in fiber comprises a pure silica core and a doped-silica cladding.

* * * * *